United States Patent
Tsukahara (10) Patent No.: US 6,854,792 B2
(45) Date of Patent: Feb. 15, 2005

(54) VEHICLE FRONT BODY STRUCTURE OF A VEHICLE OF FRAMED CONSTRUCTION

(75) Inventor: Hiroki Tsukahara, Sagamihara (JP)

(73) Assignee: Nissan Motor Co., Ltd., Kanagawa-ken (JP)

(*) Notice: Subject to any disclaimer, the term of this patent is extended or adjusted under 35 U.S.C. 154(b) by 0 days.

(21) Appl. No.: 10/775,191

(22) Filed: Feb. 11, 2004

(65) Prior Publication Data

US 2004/0164591 A1 Aug. 26, 2004

(30) Foreign Application Priority Data

Feb. 26, 2003 (JP) .................................... P 2003-048982
Dec. 12, 2003 (JP) .................................... P 2003-414927

(51) Int. Cl.[7] .............................................. B60R 11/04
(52) U.S. Cl. ............................ 296/203.02; 296/193.09; 296/30
(58) Field of Search ....................... 296/203.02, 193.09, 296/30

(56) References Cited

U.S. PATENT DOCUMENTS

| 4,264,101 A | * | 4/1981 | Gotoh ..................... 296/203.02 |
| 6,672,652 B2 | * | 1/2004 | Takeuchi et al. ........ 296/193.09 |
| 6,715,573 B2 | * | 4/2004 | Emori et al. ................ 180/68.4 |

FOREIGN PATENT DOCUMENTS

JP          6-286647          10/1994

* cited by examiner

*Primary Examiner*—Joseph D. Pape
(74) *Attorney, Agent, or Firm*—McDermott Will & Emery LLP (57) ABSTRACT

A vehicle front body structure of a vehicle of framed construction, which includes: a pair of hood ledges which constitute inner walls on left and right sides of the vehicle front body; a pair of side rails to which the hood ledges are respectively connected at their front ends; and a radiator support connected to both of the front ends of the hood ledges. Each of the hood ledges is provided on a transversely outer side thereof with a box-section member extending in a vehicle longitudinal direction.

5 Claims, 8 Drawing Sheets

VEHICLE FRONT BODY STRUCTURE OF A VEHICLE OF FRAMED CONSTRUCTION

BACKGROUND OF THE INVENTION

1. Field of the Invention

The present invention relates to a vehicle front body structure of a vehicle of framed construction.

2. Description of Related Art

A variety of vehicle body constructions are broadly classified into two categories a monocoque or unitized construction in which a self-supporting body has a rigidity member integrated therewith; and a framed construction in which a separate body is connected to a structural framework. The framed construction is mainly applied to commercial vehicles such as trucks.

Japanese Patent Application Publication Laid-open No. H6-286647 discloses a vehicle front body structure of a vehicle of framed construction (hereinafter, referred to as a frame construction vehicle), in which a body or cabin thereof is supported on a frame through a body mount having an elastic member, and the body is provided at its front end with a support member for supporting a radiator core. Specifically, the front part of the body is provided with left and right hood ledges constituting left and right inner walls thereof. The hood ledges are respectively connected to the frame and mutually connected by the support member, thereby securing rigidity of the front body.

SUMMARY OF THE INVENTION

In the vehicle front body structure as described above, however, each of the hood ledges has poor strength, since they are made of a press-formed sheet-steel.

Further, in order to reduce weight and cost, it is desired to use a resin material to form the support member for supporting the radiator core. However, the resin support member further decreases the strength and rigidity of the vehicle front body.

The present invention was made in the light of these problems. An object of the present invention is to provide a vehicle front body structure of a frame construction vehicle, which strengthens the hood ledges and enhances the rigidity of the vehicle front body, without increasing the structural complexity or the weight of the vehicle front body.

An aspect of the present invention is a vehicle front body structure of a vehicle of framed construction, comprising: a pair of hood ledges which constitute inner walls of the vehicle front body on both sides in a vehicle transverse direction, each of the hood ledges having at least one panel portion; a pair of side rails to which the hood ledges are respectively connected at their front ends; and a supporting member connected to both of the front ends of the hood ledges, wherein the hood ledge is provided on a transversely outer side thereof with a first closed section member extending in a vehicle longitudinal direction.

BRIEF DESCRIPTION OF THE DRAWINGS

The invention will now be described with reference to the accompanying drawings wherein.

DETAILED DESCRIPTION OF THE PREFERRED EMBODIMENTS

Embodiments of the present invention will be explained below with reference to the drawings, wherein like members are designated by like reference characters.

Figure 1:
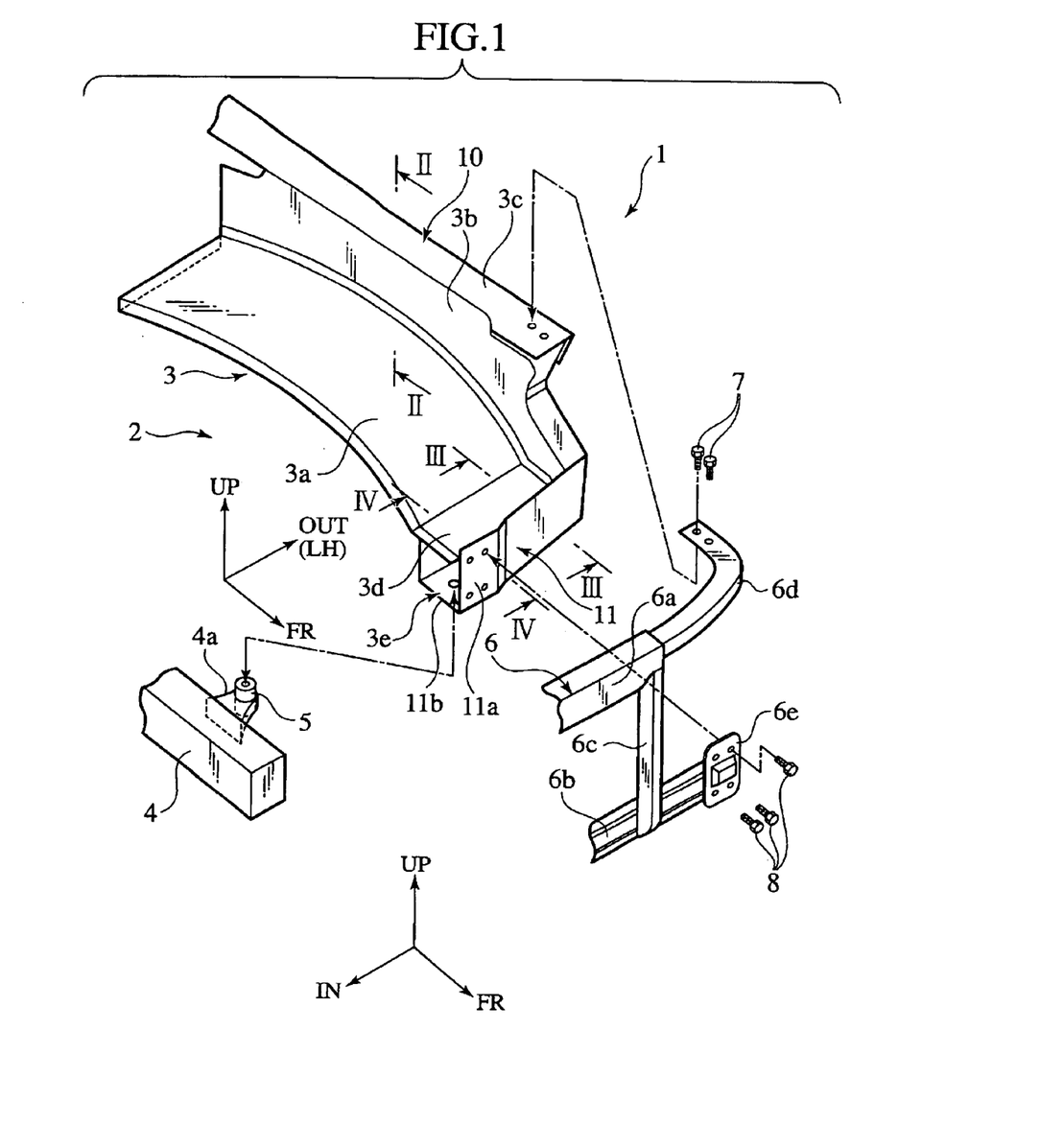
FIG. 1 is an exploded perspective view of left vehicle front body of a frame construction vehicle according to a first embodiment of the present invention.

As shown in FIG. 1, in a vehicle front body structure 1 of a frame construction vehicle according to the first embodiment, inner walls on left and right sides of a front compartment 2 respectively constitute hood ledges 3 which are separated from and opposed to each other. Main bodies 3a of the respective hood ledges 3 are made of press-formed sheet-steels, which constitute panel unit structures.

To the front ends of the respective hood ledges 3, box-section side rails 4 of a structural framework are connected through mounting members 5. A radiator core support 6 as a support member for supporting a radiator core is also connected at left and right ends thereof to the front ends of the respective hood ledges 3, whereby the left and right hood ledges 3 are joined together.

The radiator core support 6 is constituted of an upper beam 6a and a lower beam 6b which extend substantially in parallel to each other in a vehicle transverse direction, a pair of side stays 6c which connects the upper beam 6a and the lower beam 6b at points near the transversely outer ends thereof, extensions 6d extending outwardly and rearwardly from the transversely outer ends of the upper beam 6a, and mounting brackets 6e provided on the transversely outer ends of the lower beam 6b.

On the radiator core support 6 at a central portion of the upper beam 6a and the lower beam 6b, a radiator unit (not shown) including a radiator core and a radiator fan is mounted. On each of the extensions 6d, a headlamp unit (not shown) is mounted. These parts thus constitute a front module.

Figure 2:
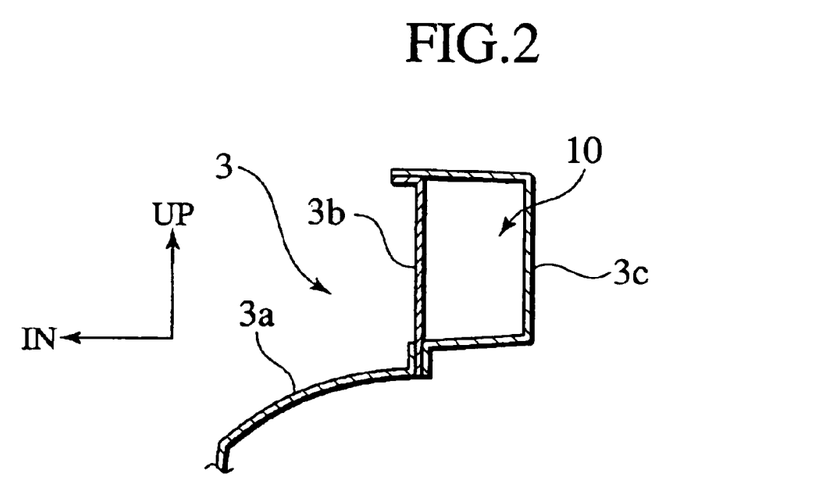
FIG. 2 is a sectional view of the vehicle front body taken along II—II line in FIG. 1.

In this embodiment, as shown in FIG. 2, to the transversely outer edge of the main bodies 3a, hood ledge vertical walls 3b are spot welded so as to extend upward therefrom. To the outer side of each of the hood ledge vertical walls 3b, a reinforcement 3c having a channel-shaped cross section is spot welded, so that the hood ledge vertical wall 3b and the reinforcement 3c form a first closed section member 10 extending in a vehicle longitudinal direction.

Figure 3:
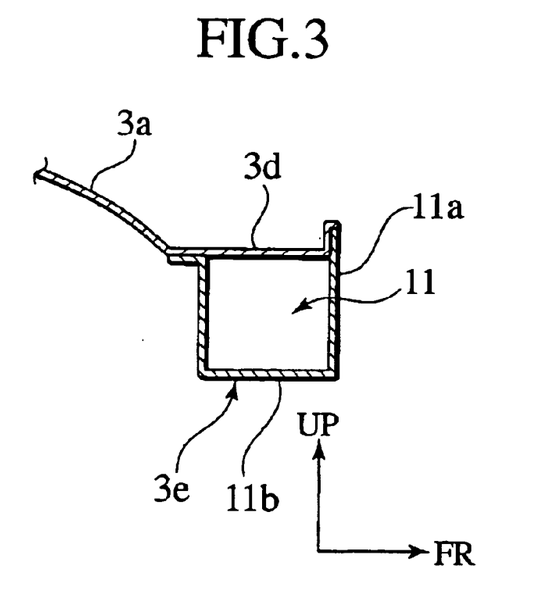
FIG. 3 is a sectional view of the vehicle front body taken along III—III line in FIG. 1.

Each of the main bodies 3a of the hood ledges 3 is formed to have on a front side thereof a flat portion 3d extending substantially horizontally frontward, to the lower side of which, as shown in FIG. 3, a body mount bracket 3e having a channel-shaped cross section is spot welded, so that the flat portion 3d and the body mount bracket 3e form a second closed section member 11 extending in the vehicle transverse direction.

The front end of the first closed section member 10 and a transversely outer end of the second closed section member 11 are connected so that the first and second closed section members 10 and 11 form a continuous closed section member extending from the transversely outer side of the vehicle to the front side thereof.

Figure 4:
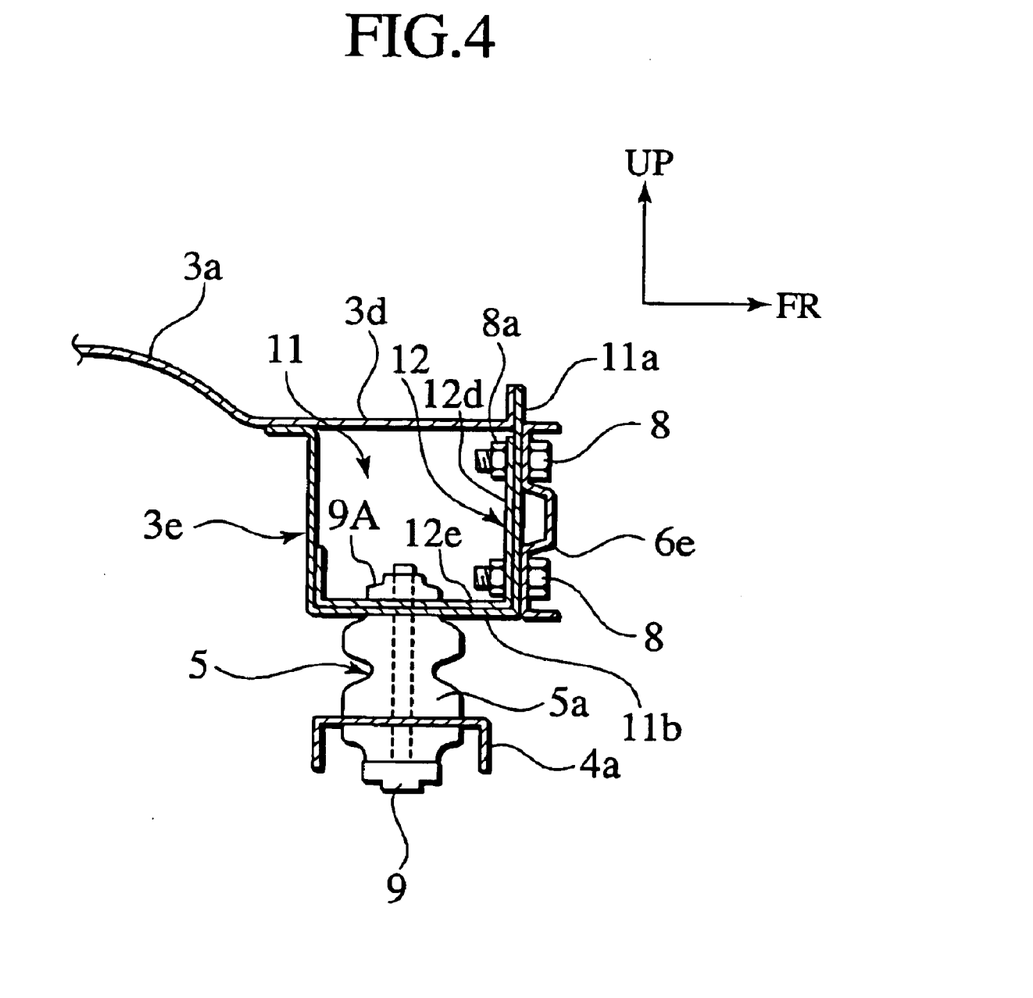
FIG. 4 is a sectional view of the vehicle front body taken along IV—IV line in FIG. 1.

Each of the extensions 6d of the radiator core support 6 is fastened at its rear end to an upper face of the front end of the first closed section member 10 with bolts 7, and as shown in FIG. 4, each of the brackets 6e thereof is fixed to a front wall 11a of the second closed section member 11 at the transversely inner end thereof with mounting bolts 8.

To a bottom wall 11b of the second closed section member 11 at the transversely inner end thereof, a bracket 4a provided on the side rail 4 is connected through the mounting member 5.

The mounting member 5 includes a rubber spacer 5a, which is interposed between the bottom wall 11b of the second closed section member 11 and the bracket 4a. A mounting bolt 9 passes through the bracket 4a, the rubber spacer 5a and the bottom wall 11b, and a threaded end thereof is screwed into a nut 9A disposed inside the second closed section member 11.

In this embodiment, as shown in FIG. 4, a reinforcing panel 12 is provided inside the second closed section member 11. The reinforcing panel 12 is formed into an L-shape in cross section having a front wall 12d along the front wall 11a and a bottom wall 12e along the bottom wall 11b of the second closed section member 11.

The reinforcing panel 12 is fixed to the front wall 11a with the mounting bolts 8 for fastening the radiator core support 6 to the front wall 11a.

That is, the mounting bolts 8 pass through the bracket 6e of the radiator core support 6, the front wall 11a and the reinforcing panel 12, and threaded ends thereof are screwed into nuts 8a which are fixed to the inner side of the front wall 12d the reinforcing panel 12.

The mounting member 5 is provided at a location corresponding to the reinforcing panel 12. The mounting bolt 9 passes through the bottom wall 12e of the reinforcing panel 12 and is screwed into the nut 9A provided on a top face thereof.

According to the vehicle front body structure of the frame construction vehicle of this embodiment, the longitudinally extending first closed section member 10 is provided on the main body 3a of the hood ledge 3 which constitutes the inner wall on one of the left and right sides of the vehicle front body. Therefore, the first closed section member 10 functions as a structural frame member of the hood ledge 3, which enhances the strength of the hood ledge 3 against a load in the vehicle longitudinal direction.

The first closed section member 10 has such a structure that the reinforcement 3c having a channel-shaped cross section is spot welded to the hood ledge vertical wall 3b. Thus, enhancement in strength of the entire hood ledge 3 is achieved without increasing the structural complexity or the weight of the hood ledge 3.

Accordingly, the rigidity of the hood ledge 3 or of the entire vehicle front body increases, while the strength required in design of the radiator core support 6 is lowered.

Thus, a resin material can be used for making the radiator core support 6 in such a manner that a resin material is molded around a structural core member thereof made of a strong material such as steel, or resin moldings are used as light loaded parts of the radiator core support 6, thus contributing to reducing the weight and cost of the vehicle body.

In this embodiment, the hood ledge 3 is provided at the front end thereof with the transversely extending second closed section member 11 which is connected to the front end of the first closed section member 10 so as to form a continuous crossed section member therewith, and is connected to and supported by the side rail 4. The second closed section member 11 functions as a structural frame, enhancing the strength of the hood ledge 3 against a load in the vehicle transverse direction and the rigidity of the vehicle front body.

The reinforcing panel 12 having substantially L-shaped cross section is provided inside the second closed section member 11. The reinforcing panel 12 is disposed along the front wall 11a and the bottom wall 11b of the second closed section member 11, and is fixed to the front wall 11a thereof. This configuration enhances the rigidity of the second closed section member 11, especially the rigidity thereof at a location supported by the mounting member 5, and advantageously increases a natural frequency of vibration of the entire supported structures including the hood ledges 3.

The reinforcing panel 12 is fastened with the mounting bolts 8 for fastening the radiator core support 6 to the front wall 11a of the second closed section member 11. Since the mounting bolts 8 are commonly used, the number of parts is reduced, thus facilitating the assembly work thereof.

Figure 5:
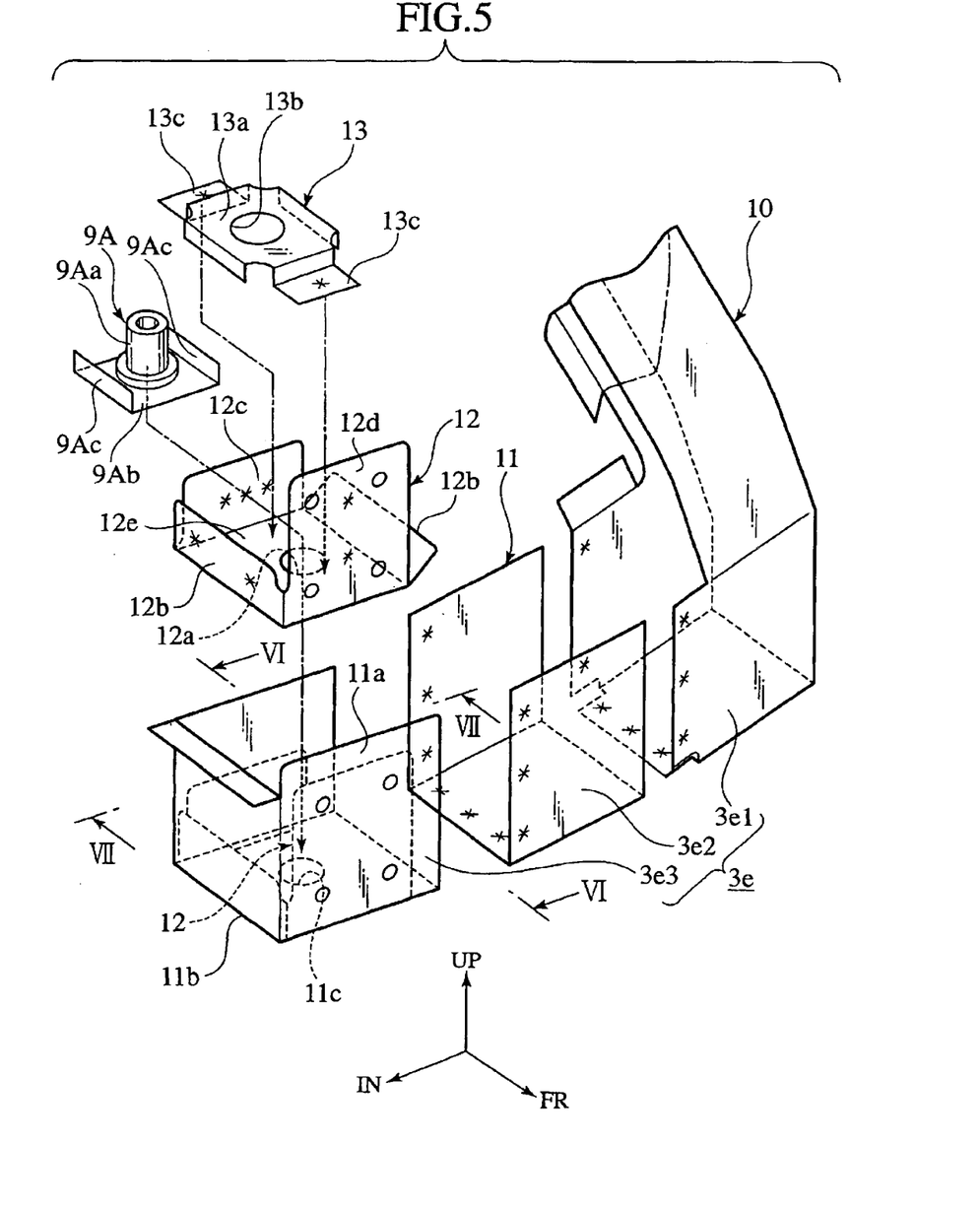
FIG. 5 is an exploded perspective view of a closed section member of a vehicle front body according to a second embodiment of the present invention.
Figure 6:
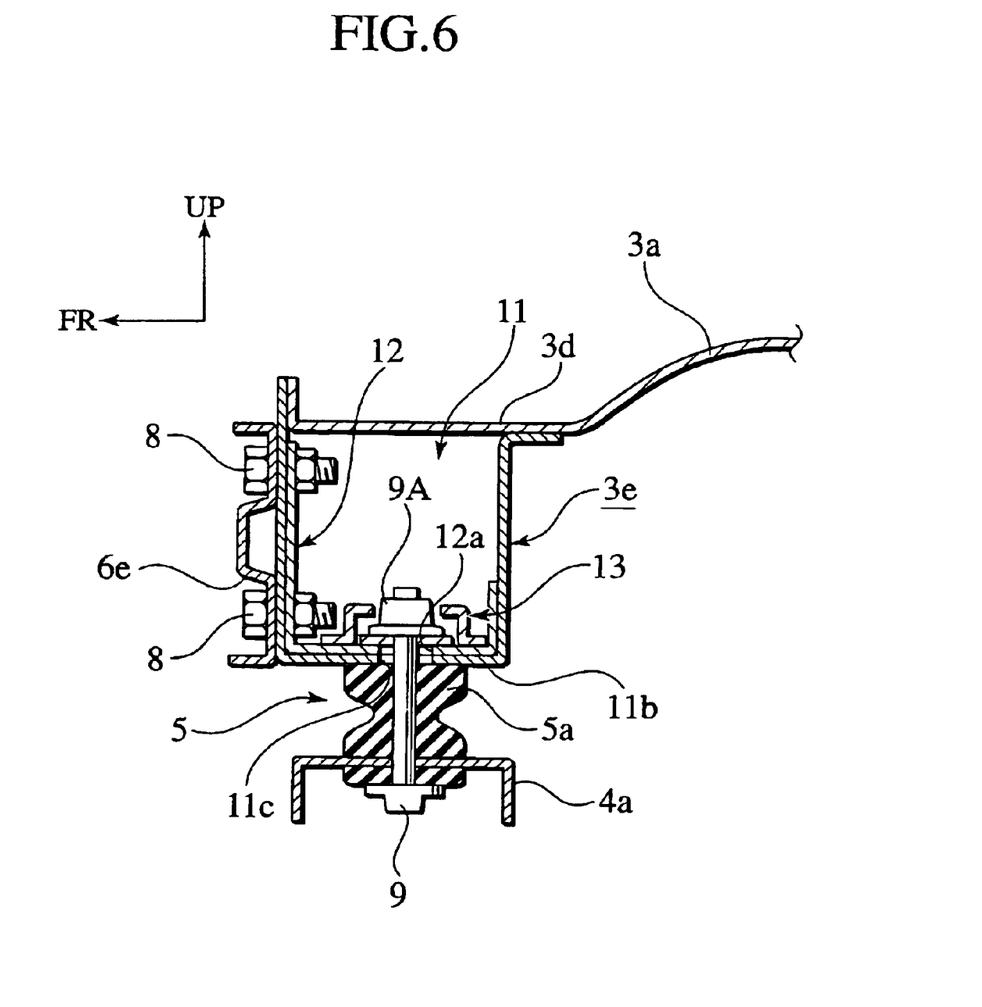
FIG. 6 is a sectional view of the vehicle front body taken along VI—VI line in FIG. 5.
Figure 7:
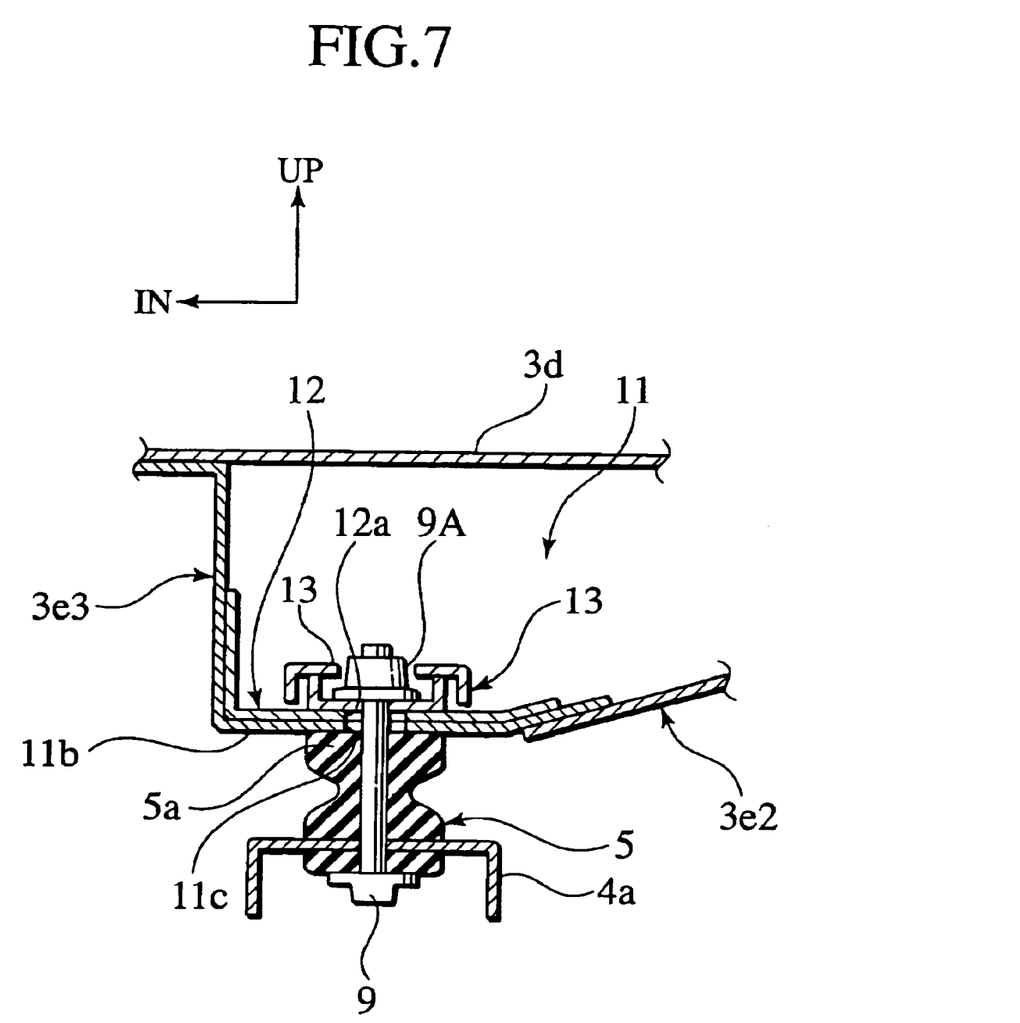
FIG. 7 is a sectional view of the vehicle front body taken along VII—VII line in FIG. 5.

As shown in FIGS. 5 to 7, in a vehicle front body structure of a frame construction vehicle according to a second embodiment of the present invention, the second closed section member 11 is connected, similarly to the first embodiment, to the vehicle body that is the bracket 4a of the side rail 4 (see FIG. 1) with the mounting bolt 9 and the nut 9A disposed inside the second closed section member 11.

Bolt insertion holes 11c and 12a through which the mounting bolt 9 is inserted are formed in the bottom wall 11b of the second closed section member 11 and the bottom wall 12e of the reinforcing panel 12, respectively. The bolt insertion holes 11c and 12a have larger diameters than a diameter of the mounting bolt 9. A nut retainer 13 is provided to cover the nut 9A so that the nut 9A can relatively move along the top face of the bottom wall 11b of the second closed section member 11, on which the nut 9A is set.

Specifically, as shown in FIGS. 5 and 8 to 10, the nut 9A is formed to have a small-diameter portion 9Aa on an upper portion thereof, and a rectangular slide plate 9Ab attached to a bottom side thereof. The slide plate 9Ab is formed to have, on its transversely inner and outer sides, a pair of upwardly extending flanges 9Ac which increase the area of contact faces of the nut 9A against the nut retainer 13.

Figure 8:
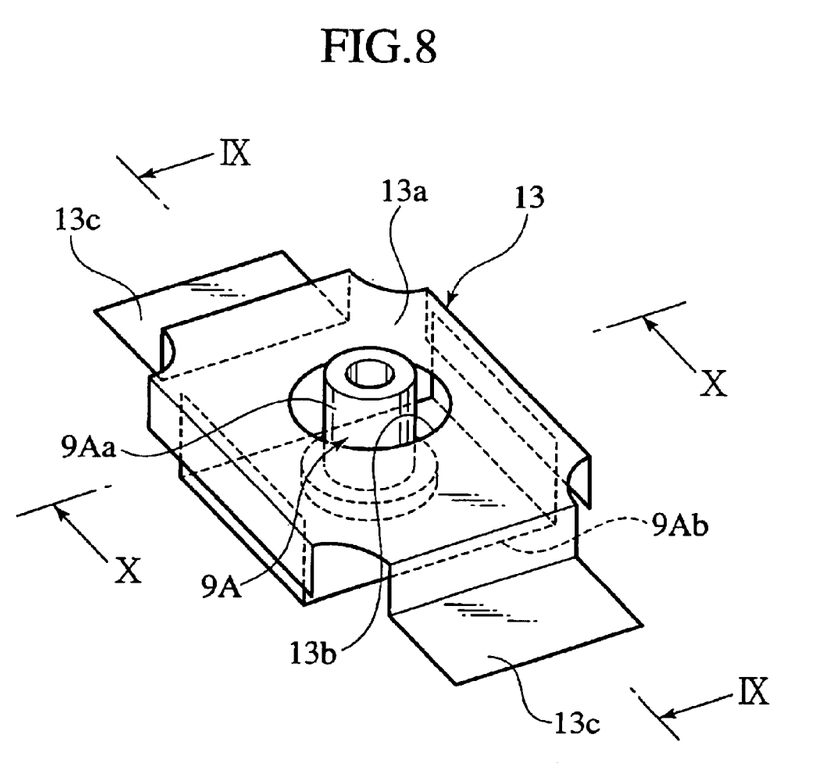
FIG. 8 is a perspective view of a nut retainer of the vehicle front body according to the second embodiment of the present invention.
Figure 9:
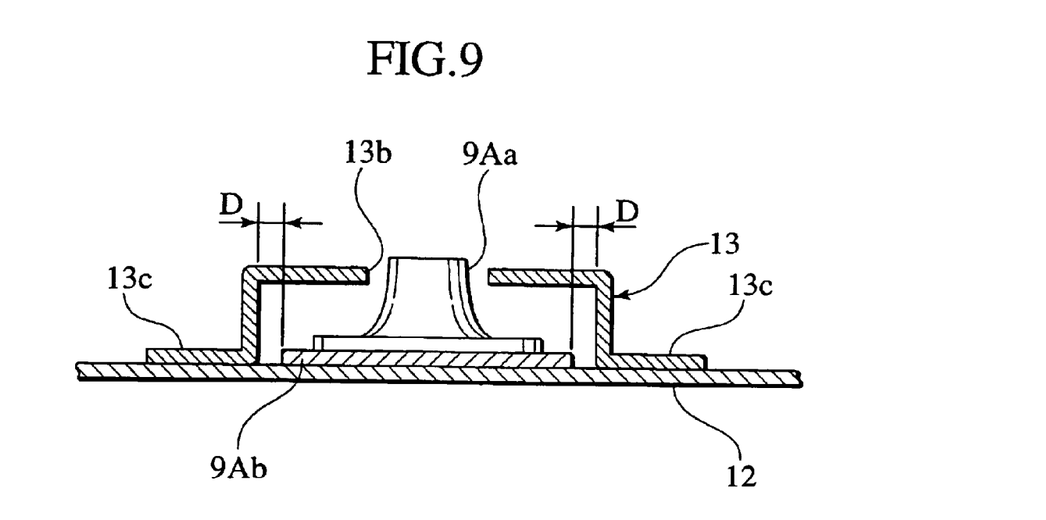
FIG. 9 is a sectional view of the nut retainer taken along IX—IX line in FIG. 8.
Figure 10:
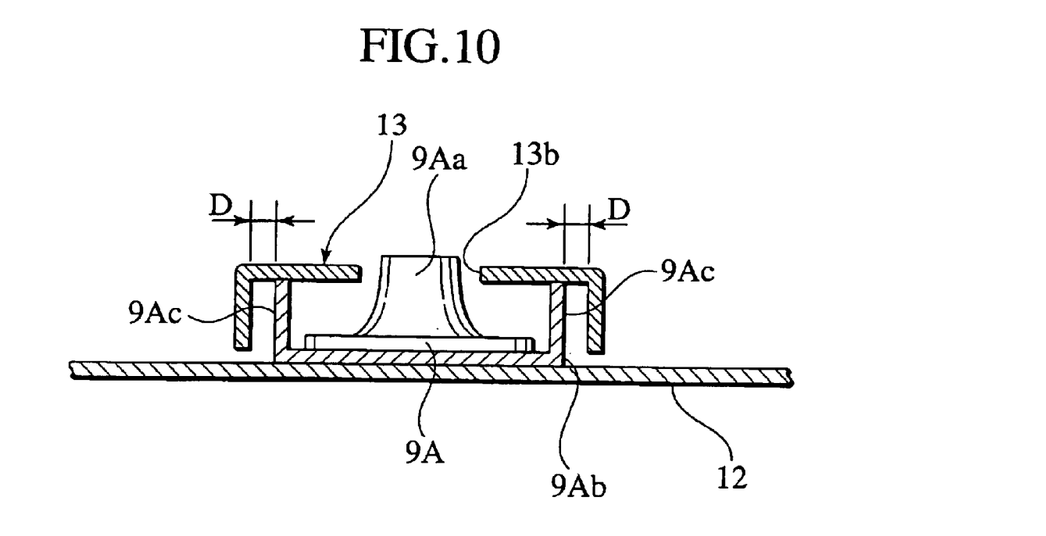
FIG. 10 is a sectional view of the nut retainer taken along X—X line in FIG. 8.

The nut retainer 13 is formed into a rectangular lid-like shape to cover the nut 9A from above. The internal dimensions of the nut retainer 13 is greater than lateral and longitudinal widths of the slide plate 9Ab thereof by a predetermined movement allowance D. On a top plate 13a of the nut retainer 13, in a central portion thereof, a large-diameter hole 13b is provided, into which the nut 9A loosely fitted. A gap provided between the circumference of the small-diameter portion 9Aa and an inner peripheral edge of the large-diameter hole 13b is set equal to or greater than the movement allowance D.

The nut retainer 13 is formed to have at lower ends on the front and rear sides thereof, a pair of flanges 13c bent to extend frontward and rearward, respectively. The flanges 13c are spot welded on an upper face of the reinforcing panel 12 on which the nut 9A is disposed.

The bolt insertion hole 11c on the bottom wall 11b of the second closed section member 11, the bolt insertion hole 12a on the reinforcing panel 12 and the large-diameter hole 13b on the nut retainer 13 are coaxially arranged.

As shown in FIGS. 9 and 10, the nut 9A can move laterally and longitudinally inside the nut retainer 13 within the movement allowance D, and the nut 9A is prevented from falling by the top plate 13a of the nut retainer 13.

The body mount bracket 3e constituting the second closed section member 11 is devided into a plurality of bracket pieces 3e1, 3e2 and 3e3. Ends of the bracket pieces 3e1, 3e2 and 3e3 on parting lines thereof are overlapped and spot welded to one another. The inner bracket piece 3e3 has a closed end on a transversely inner end thereof. The reinforcing panel 12 has left and right flanges 12b and a rear flange 12c which are bent upward. One of the left and right flanges 12b (right flange 12b in FIG. 5) is spot welded to a transversely inner wall of the bracket piece 3e3. The rear flange 12c is spot welded to a rear wall of the bracket piece 3e3. In the drawing, points to be spot welded are marked "*".

According to the vehicle front body structure of the frame construction vehicle of the second embodiment, a position of the nut 9A of the mounting bolt 9 for fastening the side rail 4 to the closed section member 11 can be adjusted within the nut retainer 13. Therefore, when the body and the side rail 4 (see FIG. 1) are connected together in the vehicle body assembling procedure, misalignment of the side rail 4 and the second closed section member 11 due to errors in dimension or location can be absorbed, whereby assembly work thereof is facilitated.

Since the body mount bracket 3e is divided in the vehicle transverse direction into the bracket pieces 3e1, 3e2 and 3e3, and the bracket pieces 3e1, 3e2 and 3e3 are overlapped and spot welded to one another to constitute the second closed section member 11, the second closed section member 11 can easily be formed to be continuous with the first closed section member 10.

The present disclosure relates to subject matters contained in Japanese Patent Application No. 2003-048982, filed on Feb. 26, 2003, and Japanese Patent Application No. 2003-414927, filed on Dec. 12, 2003, the disclosures of which are expressly incorporated herein by reference in their entirety.

The preferred embodiments described herein are illustrative and not restrictive, and the invention may be practiced or embodied in other ways without departing from the spirit or essential character thereof. The scope of the invention being indicated by the claims, and all variations which come within the meaning of claims are intended to be embraced herein.

What is claimed is:

1. A vehicle front body structure of a vehicle of framed construction, comprising:

a pair of hood ledges which constitute inner walls of the vehicle front body on both sides in a vehicle transverse direction, each of the hood ledges having at least one panel portion;

a pair of side rails to which the hood ledges are respectively connected at their front ends through a mounting member; and a supporting member connected to both of the front ends of the hood ledges, wherein each of the hood ledges is provided on a transversely outer side thereof with a first closed section member extending in a vehicle longitudinal direction.

2. The vehicle front body structure according to claim 1, wherein each of the hood ledges is provided on the front end thereof with a second closed section member which is continuous from a front end of the first close section member, and extends in the vehicle transverse direction to be connected to the side rail.

3. The vehicle front body structure according to claim 2, wherein the second closed section member is provided therein with a reinforcing member which extends along a front wall and a bottom wall of the second closed section member, and the reinforcing member is fixed at least to the front wall.

4. The vehicle front body structure according to claim 3, wherein the supporting member is fastened to the front wall of the second closed section member with a fastener, and the reinforcing member is fastened to the front wall of the second closed section member together with the supporting member with the fastener.

5. The vehicle front body structure according to claim 2, wherein the second closed section member is connected to the side rail with a bolt and a nut, wherein the nut is disposed inside the second closed section member, a bolt insertion hole which is larger in diameter than the bolt is provided on the second closed section member, and the nut is retained movably along a face of the second closed section member, on which the nut is set.

* * * * *